United States Patent
Lan et al.

(10) Patent No.: US 10,983,420 B2
(45) Date of Patent: Apr. 20, 2021

(54) DETACHABLE CONTROL DEVICE, GIMBAL DEVICE AND HANDHELD GIMBAL CONTROL METHOD

(71) Applicant: SZ DJI TECHNOLOGY CO., LTD., Shenzhen (CN)

(72) Inventors: Qiu Lan, Shenzhen (CN); Changxing Zhou, Shenzhen (CN); Wanqi Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/600,028

(22) Filed: Oct. 11, 2019

(65) Prior Publication Data
US 2020/0041878 A1 Feb. 6, 2020

Related U.S. Application Data

(63) Continuation of application No. PCT/CN2017/089000, filed on Jun. 19, 2017.

(51) Int. Cl.
*G03B 17/56* (2021.01)
*F16M 11/12* (2006.01)
(Continued)

(52) U.S. Cl.
CPC ......... *G03B 17/561* (2013.01); *F16M 11/123* (2013.01); *F16M 13/04* (2013.01);
(Continued)

(58) Field of Classification Search
USPC ........................................................ 396/55
See application file for complete search history.

(56) References Cited

U.S. PATENT DOCUMENTS

| 9,903,533 B2 * | 2/2018 | Wei ...................... G03B 17/561 |
| 2006/0055790 A1 | 3/2006 | Chen et al. |

(Continued)

FOREIGN PATENT DOCUMENTS

| CN | 202758245 U | 2/2013 |
| CN | 204086995 U | 1/2015 |

(Continued)

OTHER PUBLICATIONS

The World Intellectual Property Organization (WIPO) International Search Report for PCT/CN2017/089000 dated Mar. 15, 2018 8 Pages.

*Primary Examiner* — Rodney E Fuller
(74) *Attorney, Agent, or Firm* — Anova Law Group, PLLC

(57) ABSTRACT

A detachable control device includes an operation member, a detachable interface configured to attach the detachable control device to a handle of a gimbal device, a wireless communication circuit, and a controller configured to detect an operation on the operation member, and generate control data according to the operation. The control data includes at least one of gimbal orientation control data for controlling an attitude of a gimbal of the gimbal device or camera function control data for controlling a photographing device mounted at the gimbal to perform a corresponding function. If the detachable control device is not attached to the handle, the controller sends the control data to at least one of the gimbal device or the photographing device through the wireless communication circuit.

18 Claims, 4 Drawing Sheets

(51) Int. Cl.
*F16M 13/04* (2006.01)
*G05D 1/00* (2006.01)
*G05D 3/12* (2006.01)
*G08C 23/04* (2006.01)

(52) U.S. Cl.
CPC ............ *G05D 1/0016* (2013.01); *G05D 3/12* (2013.01); *G08C 23/04* (2013.01)

(56) References Cited

U.S. PATENT DOCUMENTS

| | | |
|---|---|---|
| 2017/0064176 A1* | 3/2017 | Kim ..................... G02B 27/644 |
| 2018/0115716 A1* | 4/2018 | Gubler .................. B64C 39/024 |
| 2018/0259123 A1* | 9/2018 | Shim .................... F16M 11/123 |
| 2019/0082932 A1* | 3/2019 | Schoonbaert ...... A61B 1/00039 |
| 2019/0246038 A1* | 8/2019 | Kim .................. H04N 5/23245 |

FOREIGN PATENT DOCUMENTS

| | | | |
|---|---|---|---|
| CN | 104536242 | A | 4/2015 |
| CN | 205067943 | U | 3/2016 |
| CN | 105468028 | A | 4/2016 |
| CN | 105472252 | A | 4/2016 |
| CN | 205716353 | U | 11/2016 |
| CN | 205726060 | U | 11/2016 |
| CN | 206018229 | U | 3/2017 |
| JP | H10257474 | A | 9/1998 |
| JP | 2001209426 | A | 8/2001 |

* cited by examiner ical, to 25
achieve the automatic stabilization and coordination. When
a photographing device is mounted at a handheld gimbal, the
handheld gimbal can automatically adjust in response to
user's actions, always keep the photographing device at a
stable and balanced angle, and make the captured images as 30
stable as possible.

DETACHABLE CONTROL DEVICE, GIMBAL DEVICE AND HANDHELD GIMBAL CONTROL METHOD

CROSS REFERENCE TO RELATED APPLICATION

This application is a continuation of International Application No. PCT/CN2017/089000, filed on Jun. 19, 2017, the entire content of which is incorporated herein by reference.

TECHNICAL FIELD

The present disclosure relates to electronic equipment and, more particularly, to a detachable control device, a gimbal device, and a handheld gimbal control method.

BACKGROUND

Handheld gimbals are currently trend of anti-shaking products. Applying three-axis gimbal technology in handheld photographing devices may achieve automatic stabilization during shooting processes. The three-axis gimbal technology controls an X-axis, a Y axis, and a Z-axis, i.e., a pitch angle, a yaw angle, and a roll angle, respectively, to achieve the automatic stabilization and coordination. When a photographing device is mounted at a handheld gimbal, the handheld gimbal can automatically adjust in response to user's actions, always keep the photographing device at a stable and balanced angle, and make the captured images as stable as possible.

Buttons may be configured on a faceplate of the handheld gimbal to control an attitude of the handheld gimbal and operation of the photographing device to take photos or videos. Existing handheld gimbals are often unable to remotely control the gimbal device or the photographing device.

SUMMARY

In accordance with the disclosure, there is provided a detachable control device including an operation member, a detachable interface configured to attach the detachable control device to a handle of a gimbal device, a wireless communication circuit, and a controller configured to detect an operation on the operation member, and generate control data according to the operation. The control data includes at least one of gimbal orientation control data for controlling an attitude of a gimbal of the gimbal device or camera function control data for controlling a photographing device mounted at the gimbal to perform a corresponding function. If the detachable control device is not attached to the handle, the controller sends the control data to at least one of the gimbal device or the photographing device through the wireless communication circuit.

Also in accordance with the disclosure, there is provided a gimbal device including a handle and a gimbal supported by the handle. The handle includes an assembleable interface configured to attach the handle to a detachable control device. The gimbal includes a wireless communication circuit configured to receive gimbal orientation control data transmitted by the detachable control device in response to the handle not being attached to the detachable control device, and a controller configured to control an attitude of the gimbal according to the gimbal orientation control data.

Also in accordance with the disclosure, there is provided a handheld gimbal including a detachable control device and a gimbal device including a handle and a gimbal supported by the handle. The detachable control device includes an operation member, a detachable interface configured to attach the detachable control device to the handle of the gimbal device, a first wireless communication circuit, and a first controller configured to detect an operation on the operation member, and generate control data according to the operation. The control data includes at least one of gimbal orientation control data for controlling an attitude of a gimbal of the gimbal device or camera function control data for controlling a photographing device mounted at the gimbal to perform a corresponding function. If the detachable control device is not attached to the handle, the first controller sends the control data to at least one of the gimbal device or the photographing device through the first wireless communication circuit. The handle of the gimbal device includes an assembleable interface configured to attach the handle to the detachable control device. The gimbal includes a second wireless communication circuit configured to receive the gimbal orientation control data transmitted by the detachable control device in response to the handle not being attached to the detachable control device, and a second controller configured to control the attitude of the gimbal according to the gimbal orientation control data.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

It should be noted that, in some embodiments, when one component is "fixedly connected" or "connected" to another component, or one component is "fixed" to another component, the component may directly contact the another component, or may not directly contact the another component and may have something in-between.

Unless otherwise specified, all the technical and scientific terms used in the embodiments of the present disclosure refer to the same meaning commonly understood by those skilled in the art. The terminologies used in the present disclosure are intended to describe specific embodiments, and not to limit the scope of the present disclosure. The term "and/or" includes any and all combinations of one or more of the listed items.

The handheld gimbal may hold a load (e.g., a photographing device), and may be configured to fasten the load, change a height, an inclination angle, and/or an orientation, or to keep the load in a certain attitude.

The present disclosure provides a handheld gimbal. The handheld gimbal of the present disclosure will be described below with reference to FIG. 1.

Figure 1:
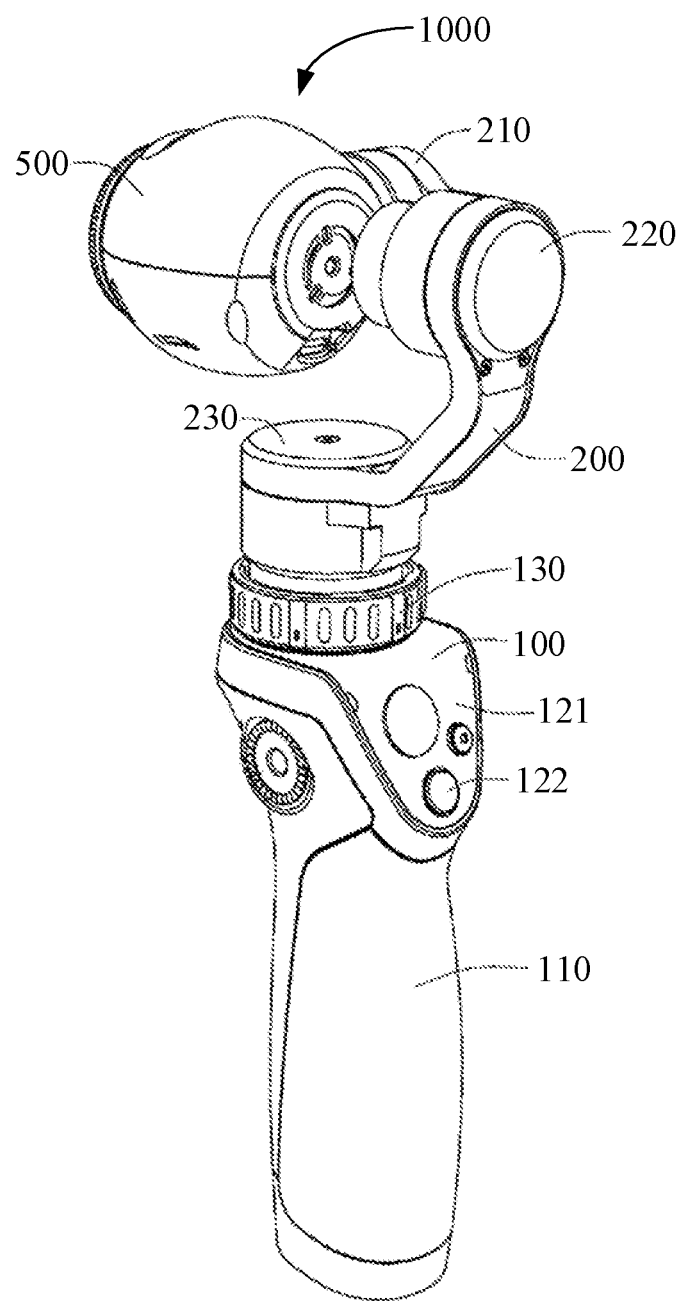
FIG. 1 is a schematic structural diagram of a handheld gimbal according to an example embodiment.

FIG. 1 is a schematic structural diagram of a handheld gimbal according to an example embodiment. As shown in FIG. 1, the handheld gimbal 1000 includes a handheld device 100 and a gimbal device 200 configured on the handheld device 100. The gimbal device 200 may be a 2-axis gimbal or a 3-axis gimbal. For illustrative purposes, the 3-axis gimbal is described in the present disclosure as an example. In other words, the gimbal includes an attitude adjustment mechanism. The attitude adjustment mechanism may be a 2-axis mechanism or a 3-axis mechanism.

In some embodiments, the gimbal device 200 includes a pitch-axis mechanism 210, a roll-axis mechanism 220, and a yaw-axis mechanism 230. That is, the attitude adjustment mechanism may include the pitch-axis mechanism 210, the roll-axis mechanism 220 and the yaw-axis mechanism 230. The pitch-axis mechanism 210 is configured to carry a photographing device 500. The photographing device 500 may be a camera, a camcorder, or a smartphone camera. The roll-axis mechanism 220 is connected to the pitch-axis mechanism 210 and the yaw-axis mechanism 230. The yaw-axis mechanism 230 is connected to the handheld device 100.

The handheld device 100 includes a housing 110 and a connecting member 130.

The connecting member 130 may be configured on top of the housing 110 for connecting to the yaw-axis mechanism 230. The housing 110 includes an operation surface 121. A plurality of operation members may be configured on the operation surface 121. For example, as shown in FIG. 1, the operation surface 121 includes a camera operation control button 122 and may also include a gimbal attitude control button. The housing 110 may also include an electromagnetic shielding plate for shielding electromagnetic waves from the outside, a battery assembly for supplying power to the handheld gimbal 1000, and a heat sink assembly for dissipating heat generated from operation of various assemblies and other electronic components in the housing 110 to the outside. The housing 110 may also include other electronic components, which are not limited by the present disclosure.

As shown in FIG. 1, the handheld gimbal 1000 itself is unable to provide remote control of the gimbal device or the photographing device. Currently, a smartphone or another portable terminal may be used to remotely control a handheld gimbal camera. Such solution often requires installation of App (application program) in the smartphone and controlling the gimbal or the photographing device through the App. The App that controls the handheld gimbal camera is not suitable for controlling a changing speed of the gimbal. Because of the insufficiency of the App operation, it is difficult for a user to use fingers to control certain members of the gimbal to move to desired positions. In other words, the user is required to constantly change finger motion speeds in the App. If the finger motion speed is too slow, a desired effect by the user may not be achieved. If the finger motion speed is too fast, overshoot may occur. In addition, the remote control of the gimbal or the photographing device may be constrained by an operation state and functions of the smartphone. For example, remote control may be prohibited by insufficient battery power of the smartphone.

The present disclosure provides a detachable control device for straightforward and convenient remote control of the gimbal or the photographing device mounted at the handheld gimbal, thereby improving the user experience.

Figure 2:
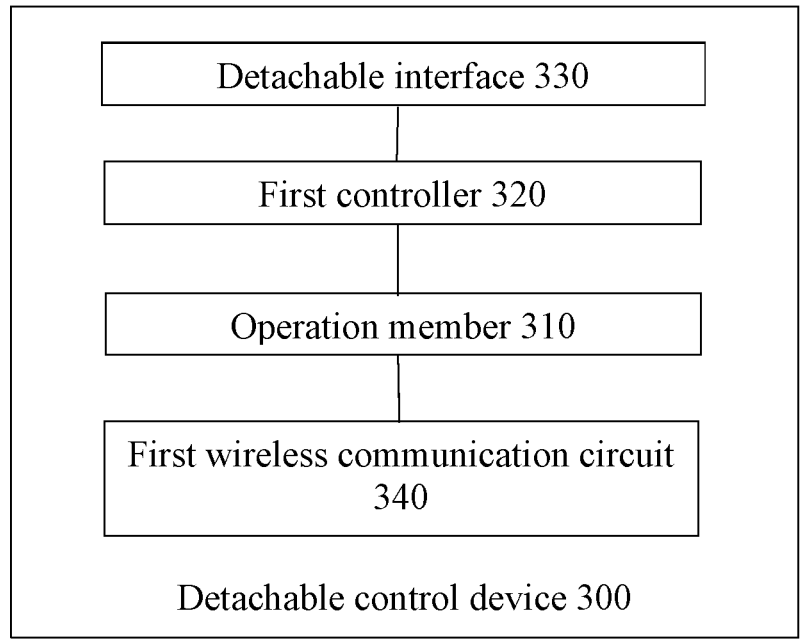
FIG. 2 is an illustrative diagram of a detachable control device according to an example embodiment.

FIG. 2 is an illustrative diagram of a detachable control device 300 according to an example embodiment. As shown in FIG. 2, the detachable control device 300 includes an operation member 310, a first controller 320, a detachable interface 330, and a first wireless communication circuit 340.

Figure 3:
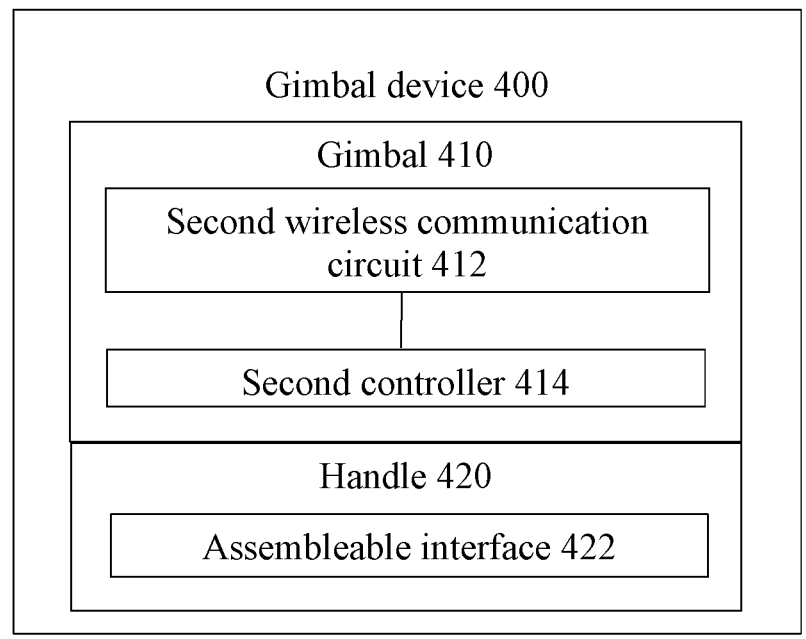
FIG. 3 is an illustrative diagram of a gimbal device according to an example embodiment.

FIG. 3 is an illustrative diagram of a gimbal device 400 according to an example embodiment. As shown in FIG. 3, the gimbal device 400 includes a gimbal 410 and a handle 420 that supports the gimbal 410. The gimbal 410 includes a second wireless communication circuit 412 and a second controller 414. The handle 420 includes an assembleable interface 422.

Figure 4:
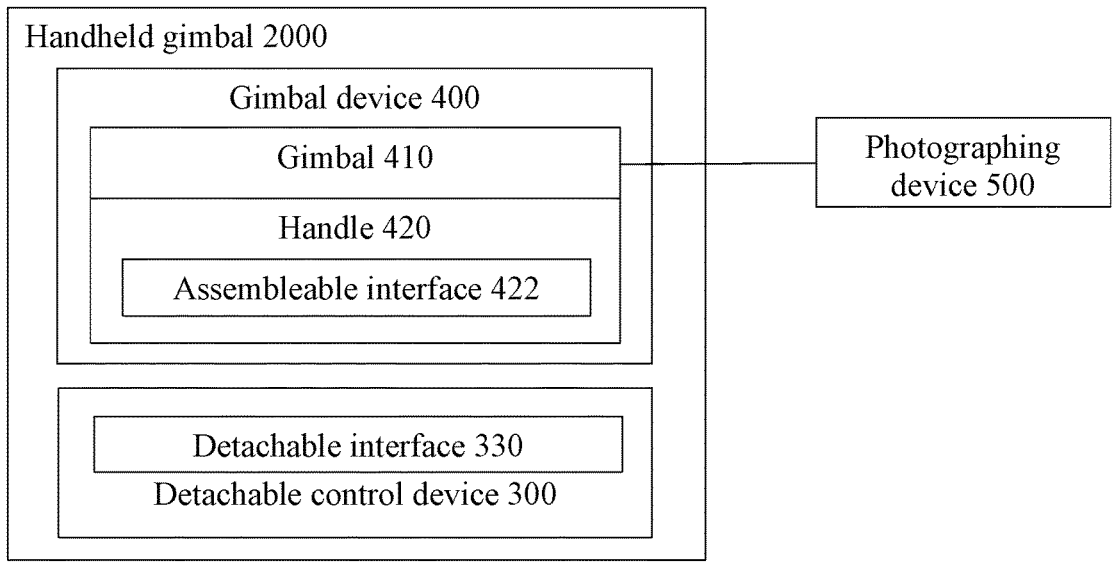
FIG. 4 is an illustrative diagram of a handheld gimbal according to an example embodiment.

FIG. 4 is an illustrative diagram of a handheld gimbal 2000 according to an example embodiment. From a perspective of the detachable control device 300, the detachable interface 330 is configured to keep the detachable control device 300 in an assembled state or a detached state. The assembled state refers to a state that the detachable control device 300 and the handle 420 of the gimbal device 400 are assembled together. The detached state refers to a state that the detachable control device 300 and the handle 420 of the gimbal device 400 are detached or separated. From a perspective of the gimbal device 400, the assembleable interface 422 is configured to keep the handle 420 in an assembled state or a detached state. The assembled state refers to a state that the detachable control device 300 and the handle 420 of the gimbal device 400 are assembled together. The detached state refers to a state that the detachable control device 300 and the handle 420 of the gimbal device 400 are detached or separated from each other.

From the perspective of the detachable control device 300, when the detachable control device 300 is in the detached state, the first controller 320 is configured to detect an operation on the operation member 310 performed by the user, generate first gimbal orientation control data, and send the first gimbal orientation control data to the gimbal 410 through the first wireless communication circuit 340 for controlling the attitude of the gimbal 410. Optionally, the first controller 320 may be configured to detect the operation on the operation member 310 performed by the user, generate first camera function control data, and send the first camera function control data to the photographing device 500 through the first wireless communication circuit 340 for controlling the photographing device 500 to perform a certain function.

From the perspective of the gimbal device 400, when the handle 420 is in the detached state, the gimbal 410 receives the first gimbal orientation control data transmitted by the detachable control device 300 through the second wireless communication circuit 412. The second controller 414 controls the attitude of the gimbal 410 according to the first gimbal orientation control data.

In some embodiments, the operation member 310 may include a gimbal control joystick and/or a camera function control button.

Further, in some embodiments, the detachable interface 330 and the assembleable interface 422 may enable the detached state or the assembled state by incorporating connecting components. For example, the detachable interface 330 and the assembleable interface 422 may be a male pluggable connector and a matching female pluggable connector, respectively.

In some embodiments, the operation member 310 may include the gimbal control joystick. When the detachable control device 300 is in the detached state, the first controller 320 is configured to detect operation on the gimbal control joystick performed by the user and generate the first gimbal orientation control data. Then, the first controller 320 sends the first gimbal orientation control data to the gimbal 410 through the first wireless communication circuit 340 for controlling the attitude of the gimbal 410.

The first gimbal orientation control data may include at least one of a pitch angle, a yaw angle, or a roll angle, etc. In other words, the controlling of the attitude of the gimbal 410 may include controlling at least one of the pitch angle, the yaw angle, or the roll angle of the gimbal 410.

Further, in some embodiments, the gimbal control joystick may be configured to control the photographing device 500 to perform certain functions. The controlling of the photographing device 500 through the gimbal control joystick may be implemented in various manners. In one example, the first controller 320 may detect the operation on the gimbal control joystick performed by the user, generate a corresponding camera function control instruction, and directly send the instruction to the photographing device 500. In another example, after the first controller 320 detects the operation on the gimbal control joystick performed by the user and generates the corresponding camera function control instruction, the first controller 320 may send the instruction to the gimbal 410 and the gimbal 410 may forward the instruction to the photographing device 500. Alternatively, after the gimbal 410 receives the instruction, the gimbal 410 may directly control the photographing device 500. The present disclosure does not limit the implementation manners.

In some embodiments, the operation member 310 may include the camera function control button. When the detachable control device 300 is in the detached state, the first controller 320 is configured to detect operation on the camera function control button performed by the user and generate the first camera function control data. Then, the first controller 320 sends the first camera function control data to the photographing device 500 mounted at the gimbal 410 through the first wireless communication circuit 340 for controlling the photographing device 500 to perform a corresponding function.

The first camera control data may include a photograph shooting instruction, a continuous photograph shooting instruction, a video shooting instruction, and/or a video shooting stop instruction, etc. The present disclosure does not limit the list of the instructions.

In some embodiments, the operation member 310 may include the gimbal control joystick and the camera function control button. The first controller 320 is configured to detect operations on the gimbal control joystick and the camera function control button performed by the user, generate the first gimbal orientation control data and the first camera function control data correspondingly, and send the first gimbal orientation control data to the gimbal 410 and the first camera function control data to the photographing device 500 through the first wireless communication circuit 340.

In some embodiments, the detachable control device 300 may also include a first wired communication circuit. The gimbal 410 of the gimbal device 400 may also include a second wired communication circuit.

From the perspective of the detachable control device 300, when the detachable control device 300 is in the assembled state, the first wired communication circuit may communicate with the gimbal device 400 and the photographing device 500. In one example, the first controller 320 is configured to detect the operation on the operation member 310 performed by the user, generate the first gimbal orientation control data, and send the first gimbal orientation control data to the gimbal device 400 through the first wired communication circuit. In another example, after the first controller 320 detects the operation on the operation member 310 performed by the user, the first controller 320 may generate the first camera function control data and send the first camera function control data to the photographing device 500 through the first wired communication circuit. In another example, after the first controller 320 detects the operations on the operation member 310 performed by the user and generate the first gimbal orientation control data, the first controller 320 may further generate the first camera function control data and send the first gimbal orientation control data to the gimbal device 400 and the first camera function control data to the photographing device 500 through the first wired communication circuit.

From the perspective of the gimbal device 400, when the handle 420 is in the assembled state, the gimbal 410 receives the first gimbal orientation control data transmitted by the detachable control device 300 through the second wired communication circuit. The second controller 414 controls the attitude of the gimbal 410 according to the first gimbal orientation control data.

In some embodiments, the operation member 310 may include the camera function control button. When the detachable control device 300 is in the assembled state, the camera function control button may be disabled. In this case, another camera function control button may be configured on the handle 420.

Figure 5:
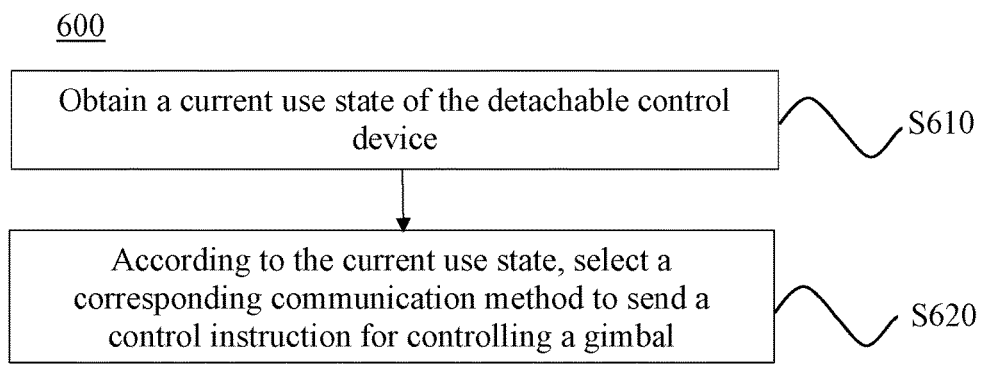
FIG. 5 is an illustrative flow chart of a handheld gimbal control method according to an example embodiment.

The present disclosure also provides a handheld gimbal control method. FIG. 5 is an illustrative flow chart of a handheld gimbal control method according to an example embodiment. The handheld gimbal control method 600 may be implemented, for example, by a controller of a detachable control device. As shown in FIG. 5, at S610, a current use state of the detachable control device is obtained.

At S620, according to the current use state, a corresponding communication method is selected to send a control instruction for controlling a gimbal.

In some embodiments, the communication method may include a wireless communication method or a wired communication method. The wireless communication method may be achieved by a first wireless communication circuit of the detachable control device and a second wireless communication circuit of the gimbal. The wired communication method may be achieved by a first wired communication circuit of the detachable control device and a second wired communication circuit of the gimbal. The present disclosure does not limit the selection of the communication methods.

In some embodiments, the first wireless communication circuit may include at least one of a Bluetooth device, an infrared device, an ultra wideband (UWB) device, or a wireless-fidelity (Wi-Fi) device. In some embodiments, the wireless communication circuit may include a device of other wireless communication technologies. The present disclosure does not limit the wireless technologies used in the wireless communication circuit.

In some embodiment, the control instructions of the gimbal may include at least one of a control instruction of controlling the attitude of the gimbal or a control instruction of controlling a photographing device mounted at the gimbal. In the context of the previous description, the control instruction of controlling the attitude of the gimbal may be the first gimbal orientation control data, and the control instruction of controlling the photographing device mounted at the gimbal may be the first camera function control data.

In some embodiments, the current use state of the detachable control device may be a current use state self-detected by the detachable control device. In some embodiments, the control method 600 may further include detecting the current use state of the detachable control device before the current use state of the detachable control device is obtained. Obtaining the current use state of the detachable control device may be achieved in such a way that after the gimbal device determines the current use state of the detachable control device, the gimbal device notifies the detachable control device.

In some embodiments, a magnet may be arranged at the detachable interface of the detachable control device. A linear Hall device may be arranged at the assembleable interface in the handle of the gimbal device. The magnet arranged at the detachable interface and the linear Hall device arranged at the assembleable interface may interact with each other. The linear Hall device may be configured to detect an intensity of the magnetic field generated by the magnet. The second controller may be configured to determine whether the detachable control device is in the detached state or in the assembled state.

In some embodiments, the linear Hall device may be arranged at the detachable interface of the detachable control device and the magnet may be arranged at the assembleable interface in the handle of the gimbal device. The linear Hall device may be configured to detect the intensity of the magnetic field generated by the magnet. The second controller may be configured to determine whether the detachable control device is in the detached state or in the assembled state. The present disclosure does not limit the configuration of the magnet and the linear Hall device. For example, a distance between the detachable control device and the handle may be determined according to the intensity of the magnetic field, to determine whether the detachable control device and the handle are int he detached state or in the assembled state.

For example, when the intensity of the magnetic field is greater than (or, greater than or equal to) a certain intensity threshold, the detachable control device and the handle may be determined to be present, that is, in the assembled state. When the intensity of the magnetic field is smaller than or equal to (or smaller than) another certain intensity threshold, the detachable control device and/or the handle may be determined to be absent, that is, in the detached state. The determination of whether the detachable control device and the handle are in the detached state or in the assembled state may include various methods. For brevity, the descriptions are not included here.

In the embodiments that the magnet is arranged at the detachable interface of the detachable control device and the linear Hall device is arranged at the assembleable interface in the handle of the gimbal device, when the detachable control device is in the assembled state, the linear Hall device may be further configured to detect an interaction with the linear Hall device caused by the operation on the gimbal control joystick performed by the user. The second controller may be further configured to generate third gimbal orientation control data according to the effect. The second controller may be further configured to control the attitude of the gimbal according to the third gimbal orientation control data.

The third gimbal orientation control data may include at least one of the pitch angle, the yaw angle, or the roll angle, etc.

In some embodiments, an infrared transmitter or an infrared receiver may be arranged at the detachable interface of the detachable control device. Correspondingly, an infrared receiver or an infrared transmitter may be arranged at the assembleable interface of the gimbal device. In one example, the first controller may be configured to determine whether the detachable control device and the handle are in the detached state or in the assembled state according to the transmission between the infrared transmitter and the infrared receiver. In another example, the second controller may be configured to determine whether the detachable control device and the handle are in the detached state or in the assembled state according to the transmission between the infrared transmitter and the infrared receiver.

In some embodiments, if the infrared receiver receives an infrared signal transmitted by the infrared transmitter, it can be determined that the detachable control device and the handle are in the assembled state. Otherwise, the detachable control device and the handle may be in the detached state. In some other embodiments, the infrared transmitter and the infrared receiver may be configured to measure a distance by using the infrared signal. When the measured distance is smaller than or equal to (or smaller than) a certain distance threshold, it can be determined that the detachable control device and the handle are present, that is, in the assembled state. When the measured distance is greater than (or greater than or equal to) a certain distance threshold, it can be determined that the detachable control device and/or the handle are absent, that is, in the detached state. The determination of whether the detachable control device and the handle are in the detached state or in the assembled state may include various methods. For brevity, the descriptions are not included here.

In some embodiments, the detachable control device may include a wired charging device. The wired charging device may be disposed at the detachable interface and may provide a power supply contact at the detachable interface. Correspondingly, the assembleable interface may include a power supply contact for charging the detachable control device through the handle. The first controller may be configured to determine whether the detachable control device is in the detached state or in the assembled state according to a voltage at the power supply contact. To charge the detachable control device through the handle, the handle may include a rechargeable battery.

In some embodiments, the second controller of the gimbal device may be configured to detect the voltage of the power supply contact to determine whether the detachable control device is in the detached state or in the assembled state. The present disclosure does not limit the methods of determining whether the detachable control device and the handle are in the detached state or in the assembled state according to the voltage.

When the detachable control device and the handle change the state, for example, from the assembled state to the detached state, or from the detached state to the assembled state, the intensity of the magnetic field, the transmission of the infrared signal, and/or the voltage may change accordingly.

The present disclosure may also include other methods of determining whether the detachable control device and the handle are in the detached state or in the assembled state. For brevity, the descriptions are not included here.

In some embodiments, the determined state of the detachable control device and the handle may be indicated by an indicator or a speaker.

In some embodiments, the detachable control device may include a first status indicator and/or a speaker. According to the state determined by the first controller, the detachable control device may use light or sound to indicate whether the detachable control device is in the detached state or in the assembled state. In some other embodiments, the second controller of the gimbal device may determine the state of the detachable control device and the handle and notify the detachable control device of the determined state. The detachable control device may use light or sound to indicate the determined state.

Similarly, the gimbal device may include a status indicator or a speaker. According to the state determined by the second controller, the gimbal device may use light or sound to indicate whether the handle is in the detached state or in the assembled state. In some other embodiments, the first controller of the detachable control device may determine the state of the detachable control device and the handle and notify the gimbal device of the determined state. The gimbal device may use light or sound to indicate the determined state. In some embodiments, the status indicator or the speaker of the gimbal device may be disposed at the handle. The present disclosure does not limit the configuration of the status indicator and the speaker.

In some embodiments, the status indicator may include a light emitting diode (LED) indicator. The present disclosure does not limit the LED indicator to be the status indicator.

In some embodiments, the control method of the handheld gimbal may also include selecting a corresponding control mode by the detachable control device to control the handheld gimbal according to the current use state. For example, the detachable control device may select the corresponding control mode to control the handheld gimbal according to the state (e.g., assembled state or detached state) of the detachable control device and the handle. The selecting of the control mode by the detachable control device may include at least one of starting a new control mode or switching between different control modes.

When the detachable control device and the handle are in the detached state, starting a new control mode may include starting a wireless distance measuring mode, an audio control mode, or a position locating mode, etc., and switching between different control modes may include switching attitude control of the gimbal from control by the gimbal control joystick to control by a body movement sensor. When the detachable control device and the handle are in the assembled state, starting a new control mode may include starting the wireless distance measuring mode, the audio control mode, and the position locating mode, etc., and switching between different control modes may include switching attitude control of the gimbal from control by the gimbal control joystick to control by the body movement sensor. The above control modes will be described in detail below.

In some embodiments, the detachable control device may also include an audio acquisition device for collecting audio data.

In some embodiments, when the detachable control device and the handle are in the detached state, the first controller may also be configured to send the audio data to the gimbal through the first wireless communication circuit. In one example, the gimbal may send the audio data to the photographing device. The photographing device may combine the audio data with the captured video data or image data. In another example, the gimbal may obtain the video data or the image data captured by the photographing device. The second controller of the gimbal may combine the audio data with the video data or the image data, and then send combined data to the photographing device for outputting.

An existing camera mounted at the handheld gimbal may also be provided with the audio acquisition device. However, the audio acquisition device is often configured on the gimbal, the photographing device, or the handle connected to the gimbal. Usually, when the user remotely controls the camera mounted at the handheld gimbal, the user and the camera mounted at the handheld gimbal may be separated by a distance. Then, when the user shoots photos, videos, or live streaming, a sound level of the audio data collected by the audio acquisition device may be low. In some embodiments, the audio acquisition device may be configured on the detachable control device. When the user remotely controls the camera mounted at the handheld gimbal, the audio acquisition device may function as a small portable microphone. Thus, the sound quality of the audio data collected by the audio acquisition device can be improved.

Optionally, the present disclosure provides the audio control mode. In one example, the detachable control device may also include an audio recognition device for recognizing the audio data collected by the audio acquisition device to determine second gimbal orientation control data corresponding to the audio data. The first controller may also be configured to send the second gimbal orientation control data to the gimbal through the first wireless communication circuit. For example, the audio data may be used to control the gimbal to perform up-and-down pitching, left-right panning, or clockwise-counterclockwise rollover, etc. The present disclosure does not limit audio data activated operations.

In some other embodiments, the audio recognition device may be configured to recognize the audio data collected by the audio acquisition device to determine second camera function control data. The first controller may also be configured to send the second camera function control data to the photographing device through the first wireless communication circuit. For example, in the audio control mode, the audio data may be used to control the photographing device to perform operations such as photograph shooting, continuous photograph shooting, video shooting, and video shooting stop, etc. The present disclosure does not limit the list of audio controlled operations.

In some embodiments, the audio recognition may be performed by the gimbal and/or the photographing device. For example, the first controller may also be configured to send the audio data to the gimbal and/or the photographing device through the first wireless communication circuit. Thus, the gimbal and/or the photographing device may recognize the audio data to determine the second gimbal orientation control data and/or the second camera function control data corresponding to the audio data.

In some embodiments, recognizing the audio data by the gimbal may be realized by arranging the audio recognition device at the gimbal. For example, the second wireless communication circuit may be configured to receive the audio data transmitted by the detachable control device. The audio recognition device included in the gimbal may recognize the audio data to determine the second gimbal orientation control data corresponding to the audio data. The second controller may also be configured to control the attitude of the gimbal according to the second gimbal orientation control data.

Similarly, recognizing the audio data by the photographing device may be realized by arranging the audio recognition device at the photographing device. For brevity, the descriptions are not repeated here.

Optionally, the present disclosure provides the wireless distance measuring mode. In one example, the first controller may also be configured to receive location detection data from the gimbal through the first wireless communication circuit and to send location response data to the gimbal through the first wireless communication circuit. Thus, the gimbal may calculate a distance between the detachable control device and the gimbal according to the location detection data and the location response data. Correspondingly, the second controller may also be configured to send the location detection data to the detachable control device through the second wireless communication circuit and to receive the location response data transmitted by the detachable control device through the second wireless communication circuit. The second controller may also be configured to calculate the distance between the detachable control device and the gimbal according to the location detection data and the location response data.

The detachable control device is often held in the user's hand. Determining the distance between the detachable control device and the gimbal may also determine a distance between the user and the gimbal.

In addition, the gimbal may determine user's orientation through the photographing device mounted at the gimbal. After the user's distance and the user's orientation are obtained, the gimbal or the second controller of the gimbal may actively track the user according to the user's distance and the user's orientation.

Optionally, the present disclosure provides the position locating mode. In one example, the detachable control device may also include a position locating device for determining a geographical location of the detachable control device. The first controller may also be configured to generate location data according to the geographical location determined by the position locating device and to send the location data to the gimbal through the first wireless communication circuit.

The position locating device may be based on Global Positioning System (GPS), Global Navigation Satellite System (GLONASS), China's Beidou Navigation Satellite System (BDS), or European Union's Galileo satellite system. The present disclosure does not limit the location technologies used in the position locating device.

After the gimbal obtains the location data, the gimbal may send the location data to the photographing device. The photographing device may insert the location data into the photos and videos captured by the photographing device, thereby facilitating convenience in user's search and classification. Moreover, certain extended functions may be made possible. For example, according to the location data, certain App may display the captured photos at the corresponding locations on map.

In addition, after the position of the detachable control device is determined, the location data may be used to actively track the detachable control device. The present disclosure does not limit such application. For example, the second controller of the gimbal may also be configured to receive the location data uploaded by the detachable control device through the second wireless communication circuit for actively tracking the detachable control device or the user.

Optionally, the present disclosure provides a body movement control mode. In one example, the detachable control device may also include an inertial measurement unit (IMU). When the detachable control device is in the detached state, the inertial measurement unit may be configured to detect attitude data of the detachable control device. The first controller may also be configured to generate corresponding third gimbal orientation control data or third camera function control data according to the attitude data of the detachable control device and to send the third gimbal orientation control data to the gimbal or the third camera function control data to the photographing device through the first wireless communication circuit.

A change in the attitude of the detachable control device may be caused by user's action. Thus, when the user performs an action, the corresponding attitude data may be generated for the corresponding detachable control device, and the corresponding operation may be performed on the gimbal or the photographing device. For example, in the body movement control mode, shaking the detachable control device for a few times by the user may remotely control the photographing device to perform a photograph shooting function.

In some embodiments, the detachable control device may also include the wired charging device. The wired charging device may be disposed at the detachable interface and may provide the power supply contact at the detachable interface. Correspondingly, the assembleable interface may include the power supply contact for charging the detachable control device through the handle. In addition, the detachable control device may also include a wireless charging device for wirelessly charging the detachable control device when the detachable control device is in the detached state. In this case, the wireless charging may be based on existing wireless charging technologies. The present disclosure does not limit the wireless charging technology used to charge the detachable control device.

In some embodiments, the detachable control device may also include a second status indicator. The first controller may be configured to receive operation status data transmitted by the photographing device through the first wireless communication circuit. The second status indicator may be configured to display current operation status of the photographing device according to the operation status data. For example, the second status indicator may be configured to indicate a standby mode, a video shooting mode, and a photograph shooting mode, etc. The present disclosure does not limit the operation status indicated by the second status indicator.

In some embodiments, the detachable control device may also include a display screen. The first controller may also be configured to receive image data transmitted by the photographing device through the first wireless communication circuit. The display screen may display images transmitted by the photographing device according to the image data. For example, the display screen may display captured photos or videos. In addition, the display screen may also display battery charge level and flash status, etc. of the photographing device. The display screen may also display other status information of the handheld gimbal camera. The present disclosure does not limit the content displayed on the display screen.

Figure 6:
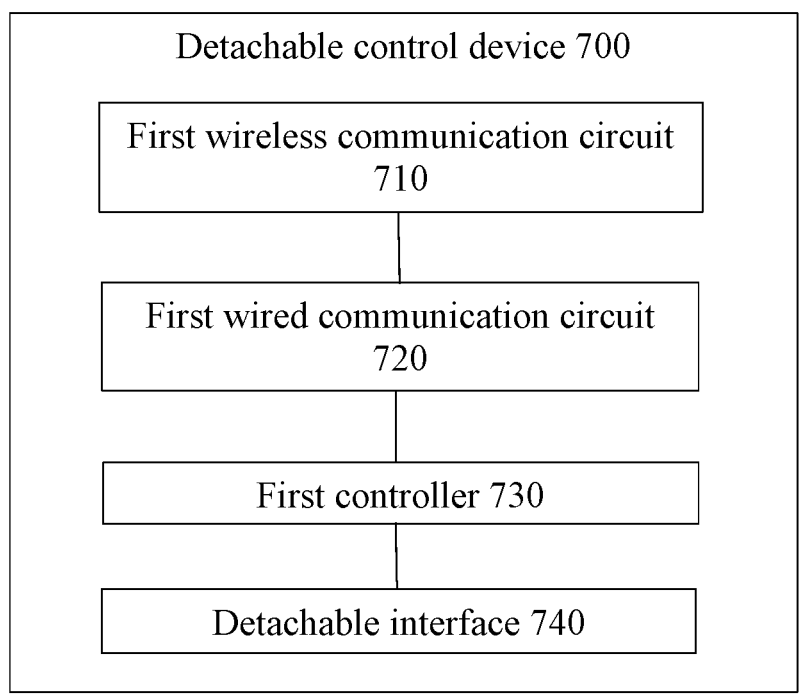
FIG. 6 is an illustrative diagram of another detachable control device according to an example embodiment.

The present disclosure also provides another detachable control device of the handheld gimbal. FIG. 6 is an illustrative diagram of another example detachable control device 700 according to an example embodiment. As shown in FIG. 6, the detachable control device 700 includes a first wireless communication circuit 710 configured to transmit control signals wirelessly, a first wired communication circuit 720 configured to transmit control signals through wired connections, a first controller 730 connected to the first wireless communication circuit 710 and the first wired communication circuit 720, and a detachable interface 740 configured to detachably connect to a handle of the handheld gimbal, such that the detachable control device may be in different use states with respect to the handle of the handheld gimbal.

The first controller 730 may obtain a current use state of the detachable control device 700 and select a corresponding communication method according to the current use state to send a control instruction for controlling the gimbal.

In some embodiments, the use states of the detachable control device 700 may include an assembled state and a detached state. The assembled state refers to a state that the detachable control device 700 and the handle of the handheld gimbal are assembled together. The detached state refers to a state that the detachable control device 700 and the handle of the handheld gimbal are detached or separated from each other.

In some embodiments, the communication methods may include a wireless communication method and a wired communication method.

In some embodiments, the detachable control device 700 may also include a status detection device, which is connected to the first controller 730 to detect the current use state of the detachable control device 700.

In some embodiment, the control instructions of the gimbal may include at least one of a control instruction of controlling the attitude of the gimbal or a control instruction of controlling a photographing device mounted at the gimbal.

In some embodiments, the first controller may be configured to select a corresponding control mode for controlling the handheld gimbal according to the current use state.

The selecting of the control mode by the detachable control device 700 may include at least one of starting a new control mode or switching between different control modes.

In the embodiments of the present disclosure, the detachable control device may be a wearable device. On one hand, the detachable control device in the detached state may turn into the wearable device. On the other hand, the detachable control device together with straps for supporting and fastening the detachable control device may be considered as the wearable device. For example, the wearable device may include a wrist-worn wearable device, such as a wristwatch, and a wristband, etc. The wearable device may also include a finger-worn wearable device, such as a ring, etc. The wearable device may include a foot-worn wearable device, such as a shoe, a sock, or another product worn on the foot. The wearable device may include a head-mount wearable device, such as glasses, a helmet, a headband, or a necklace, etc. The wearable device may include another product. The present disclosure does not limit the type of the wearable device.

The present disclosure also provides a handheld gimbal. The handheld gimbal may include a detachable control device consistent with the disclosure and a gimbal device consistent with the disclosure.

The present disclosure also provides a handheld gimbal camera. The handheld gimbal camera may include a detachable control device consistent with the disclosure, a gimbal device consistent with the disclosure, and a photographing device mounted at the gimbal device.

The present disclosure also provides a computer readable storage medium that stores program instructions. When the program instructions are executed on a computer, the computer executes a handheld gimbal control method consistent with the disclosure, such as one of the above-described example methods. For example, the computer may be the detachable control device, the gimbal device, the handheld gimbal, or the handheld gimbal camera, or a processor of any of these devices.

The present disclosure also provides a computer program product that includes program instructions. When the program instructions of the computer program product are executed by a computer, the computer can implement a handheld gimbal control method consistent with the disclosure, such as one of the above-described example methods. For example, the computer program product may be executed by the detachable control device, the gimbal device, the handheld gimbal, or the handheld gimbal camera, or a processor of any of these devices.

The embodiments of the present disclosure may be implemented entirely or partially by software, hardware, firmware, or any combination thereof. When implemented in software, the embodiments of the present disclosure may be implemented entirely or partially in the form of a computer program product. The computer program product may include one or more computer program instructions. Executing the computer program instructions on a computer may entirely or partially produce the flow chart process or functions according to the embodiments of the present disclosure. The computer may be a general purpose computer, a specialized computer, a computer network, or other programmable devices. The computer program instructions may be stored in a computer readable storage medium or may be transferred from one computer readable storage medium to another computer readable storage medium. For example, the computer program instructions may be transferred from one network node, one computer, one server, or one data center to another network node, another computer, another server, or another data center through a wired (e.g., coaxial cable, optical fiber, digital subscriber line) or wireless (e.g., infrared, radio, microwave, etc.) communication method. The computer readable storage medium may include any computer accessible usable medium or one or more of data storage equipment such as usable medium integrated servers or data centers. The usable medium may include a magnetic medium (e.g., a floppy disk, a hard disk, a magnetic tape), or a semiconductor medium (e.g., solid state disk), etc.

The phrase "one embodiment," "some embodiments," or "other embodiments" in the specification means that the particular features, structures, or characteristics related to the embodiments are included in at least one embodiment of the present disclosure. Thus, they are not intended to be the same embodiment. In addition, these particular features, structures, or characteristics may be combined in any suitable manner in one or more embodiments.

In various embodiments of the present disclosure, sequence numbers of the processes have nothing to do with the order of execution sequence. Instead, the order of executing the processes should be determined by functions and intrinsic logics. The sequence numbers should not limit the implementation of the embodiments of the present disclosure.

In various embodiments of the present disclosure, the phrase "B corresponding to A" can mean that B is associated with A and/or B can be determined according to A. However, determining B from A does not mean that B is determined only based on A, but B can be determined based on A and/or other information.

The term "and/or" herein is merely an association relationship describing associated objects, representing three relationships. For example, A and/or B may represent an existence of A only, an existence of B only, and a coexistence of both A and B. In addition, the character "/" in the specification generally represents that the associated objects have an "or" relationship.

Those skilled in the art will appreciate that the elements and algorithm steps described in various embodiments of the present disclosure can be implemented in electronic hardware or a combination of computer software and electronic hardware. Whether a function is implemented in hardware or software may be determined by specific application and design constraints of the particular solution. Those skilled in the art may use different methods to implement a function described in the specification depending on each specific application. However, such implementation should not be considered to be beyond the scope of the present disclosure.

Those skilled in the art may clearly understand that, for convenience and brevity, detailed operation process of systems, devices and sub-systems may refer to corresponding process previously described in the embodiments and may not be repeated.

In the embodiments of the present disclosure, the disclosed systems, devices and methods may be implemented in other manners. For example, the device embodiments described above are merely illustrative. For example, the division of sub-systems may be only a logical function division. In practical applications, sub-systems may be divided differently. For example, multiple sub-systems or components may be combined or integrated into another system. Certain features may be omitted or not executed. Further, mutual coupling, direct coupling, or communication connection shown or discussed may be implemented by certain interfaces. Indirect coupling or communication connection of devices or sub-systems may be electrical, mechanical, or in other forms.

Sub-systems described as separated components may or may not be physically separated. A sub-system shown as a separate component may or may not be a physically separated sub-system. That is, the sub-system may be located in one place or may be distributed in multiple network elements. According to practical applications, all or a portion of sub-systems may be implemented to achieve the objectives of the embodiments of the present disclosure.

In addition, functional sub-systems described in different embodiments of the present disclosure may be integrated into one processing sub-system or may exist physically separately. Two or more sub-systems may be integrated into one sub-system.

The foregoing descriptions are merely some implementation manners of the present disclosure, but the scope of the present disclosure is not limited thereto. Any change or replacement that can be conceived by a person skilled in the art based on the technical scope disclosed by the present application should be covered by the scope of the present disclosure. A true scope and spirit of the invention is indicated by the following claims.

What is claimed is:

1. A detachable control device comprising:
    an operation member;
    a detachable interface configured to attach the detachable control device to a handle of a gimbal device;
    a wireless communication circuit;
    a controller configured to:
        detect an operation on the operation member;
        generate control data according to the operation, the control data including at least one of gimbal orientation control data for controlling an attitude of a gimbal of the gimbal device or camera function control data for controlling a photographing device mounted at the gimbal to perform a corresponding function; and
        in response to the detachable control device not being attached to the handle, send the control data to at least one of the gimbal device or the photographing device through the wireless communication circuit; and
    an audio acquisition device configured to collect audio data;
    wherein the controller is further configured to send the audio data to at least one of the gimbal device or the photographing device through the wireless communication circuit.

2. The detachable control device of claim 1, further comprising:
    a wired communication circuit;
    wherein the controller is further configured to, in response to the detachable control device being attached to the handle, send the control data to the at least one of the gimbal device or the photographing device through the wired communication circuit.

3. The detachable control device of claim 1, wherein the operation member includes at least one of:
    a gimbal control joystick configured to receive an operation for generating the gimbal orientation control data; or
    a camera function control button configured to receive an operation for generating the camera function control data.

4. The detachable control device of claim 1, further comprising:
    an audio recognition device;
    wherein:
        the control data is first control data, the gimbal orientation control data is first gimbal orientation control data, and the camera function control data is first camera function control data;
        the audio recognition device is configured to recognize the audio data to determine second control data including at least one of second gimbal orientation control data or second camera function control data; and
        the controller is further configured to send the second control data to at least one of the gimbal device or the photographing device through the wireless communication circuit.

5. The detachable control device of claim 1, wherein the wireless communication circuit includes at least one of a Bluetooth device, an infrared device, a ultra-wideband device, or a Wi-Fi device.

6. The detachable control device of claim 1, wherein the controller is further configured to:
    receive location detection data from the gimbal device through the wireless communication circuit; and
    send location response data to the gimbal device through the wireless communication circuit.

7. The detachable control device of claim 1, further comprising:
    a position locating device configured to determine a geographical location of the detachable control device;
    wherein the controller is further configured to generate location data according to the geographical location determined by the position locating device and send the location data to the gimbal device through the wireless communication circuit.

8. The detachable control device of claim 1, further comprising:
an inertial measurement unit configured to, in response to the detachable control device not being attached to the handle, detect attitude data of the detachable control device;
wherein:
the control data is first control data, the gimbal orientation control data is first gimbal orientation control data, and the camera function control data is first camera function control data; and
the controller is further configured to:
generate second control data according to the attitude data of the detachable control device, the second control data including at least one of second gimbal orientation control data or second camera function control data; and
send the second control data to at least one of the gimbal device or the photographing device through the wireless communication circuit.

9. The detachable control device of claim 1, further comprising:
a magnet at the detachable interface and configured to interact with a linear Hall device at an assembleable interface of the handle.

10. The detachable control device of claim 1, further comprising:
a wireless charging device configured to wirelessly charge the detachable control device in response to the detachable control device being not attached to the handle; and
a wired charging device at the detachable interface configured to charge the detachable control device, the wired charging device including a power supply contact;
wherein the controller is further configured to determine whether the detachable control device is attached to the handle based on a voltage at the power supply contact.

11. The detachable control device of claim 1, further comprising:
an infrared transmitter or an infrared receiver at the detachable interface;
wherein the controller is further configured to determine whether the detachable control device is attached to the handle according to a transmission of infrared signal at the infrared transmitter or the infrared receiver.

12. The detachable control device of claim 1, further comprising at least one of:
a first status indicator or a loudspeaker configured to indicate whether the detachable control device is attached to the handle according to a determination by the controller;
a second status indicator configured to indicate a current operation status of a photographing device mounted at the gimbal device determined according to operation status data transmitted by the photographing device and received by the controller through the wireless communication circuit; or
a display screen configured to display an image generated according to image data transmitted by the photographing device and received by the controller through the wireless communication circuit.

13. The detachable control device of claim 1, wherein:
the detachable control device is a wearable device.

14. A gimbal device comprising:
a handle including an assembleable interface configured to attach the handle to a detachable control device; and
a gimbal supported by the handle and including:
a wireless communication circuit configured to, in response to the handle not being attached to the detachable control device, receive gimbal orientation control data transmitted by the detachable control device; and
a controller configured to:
control an attitude of the gimbal according to the gimbal orientation control data;
send location detection data to the detachable control device through the wireless communication circuit;
receive location response data from the detachable control device through the wireless communication circuit; and
calculate a distance between the detachable control device and the gimbal device according to the location detection data and the location response data.

15. The gimbal device of claim 14, wherein the gimbal further includes a wired communication circuit configured to, in response to the handle being attached to the detachable control device, receive the gimbal orientation control data.

16. The gimbal device of claim 14, wherein:
the gimbal orientation control data is first gimbal orientation control data;
the wireless communication circuit is further configured to receive audio data sent by the detachable control device;
the gimbal includes an audio recognition device configured to recognize the audio data to determine second gimbal orientation control data; and
controller is further configured to control the attitude of the gimbal according to the second gimbal orientation control data.

17. The gimbal device of claim 14, wherein the controller is further configured to:
receive location data uploaded by the detachable control device through the wireless communication circuit; and
actively track the detachable control device according to the location data.

18. A handheld gimbal comprising:
a detachable control device; and
a gimbal device including a handle and a gimbal supported by the handle;
wherein the detachable control device includes:
an operation member;
a detachable interface configured to attach the detachable control device to the handle of the gimbal device;
a first wireless communication circuit; and
a first controller configured to:
detect an operation on the operation member;
generate control data according to the operation, the control data including at least one of gimbal orientation control data for controlling an attitude of the gimbal or camera function control data for controlling a photographing device mounted at the gimbal to perform a corresponding function; and
in response to the detachable control device not being attached to the handle, send the control data to at least one of the gimbal device or the photographing device through the first wireless communication circuit; and, wherein:
the handle includes an assembleable interface configured to attach the handle to the detachable control device; and
the gimbal includes:
a second wireless communication circuit configured to, in response to the handle not being attached to the detachable control device, receive the gimbal orientation control data transmitted by the detachable control device; and
a second controller configured to:
control the attitude of the gimbal according to the gimbal orientation control data;
receive location data uploaded by the detachable control device through the wireless communication circuit; and
actively track the detachable control device according to the location data.

* * * * *